United States Patent [19]

Bergano

[11] Patent Number: 5,491,576
[45] Date of Patent: Feb. 13, 1996

[54] DUAL-WAVELENGTH DATA TRANSMITTER FOR REDUCING FADING IN AN OPTICAL TRANSMISSION SYSTEM

[75] Inventor: Neal S. Bergano, Lincroft, N.J.

[73] Assignee: AT&T Corp., Murray Hill, N.J.

[21] Appl. No.: 173,288

[22] Filed: Dec. 23, 1993

[51] Int. Cl.⁶ .................................................. H04B 10/00
[52] U.S. Cl. ........................... 359/156; 359/161; 359/187
[58] Field of Search ..................................... 359/156, 154, 359/161, 180, 181, 187, 188, 153, 337; 385/1, 5; 372/27

[56] References Cited

U.S. PATENT DOCUMENTS 5,107,358  4/1992  Hodgkinson et al. .................. 359/156
5,311,346  5/1994  Haas et al. .............................. 359/161

Primary Examiner—Hezron E. Williams
Assistant Examiner—Richard A. Moller
Attorney, Agent, or Firm—Mark K. Young

[57] ABSTRACT

The problems relating to SNR fading over long optical transmission paths are overcome by dynamically controlling an optical signal source having two signal components each with a different wavelength, where the parameters to be controlled include the wavelengths of the two signal components, the relative and absolute SOPs of the two signal components, and the relative delays between the data patterns carried by the two signal components so that the polarization of the two signal components of the optical signal are continuously reoptimized in the presence of PDL, PMD, PDHB, and fiber nonlinearities.

39 Claims, 4 Drawing Sheets

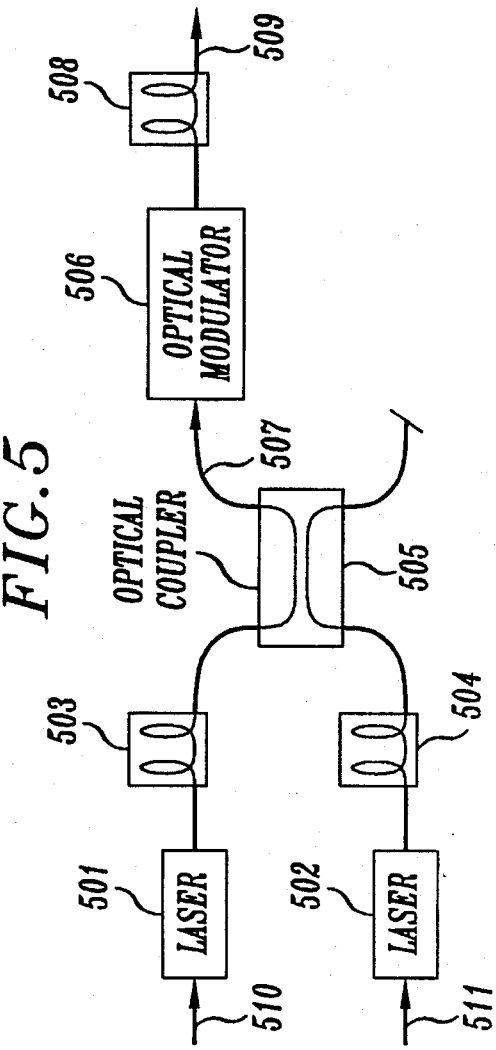
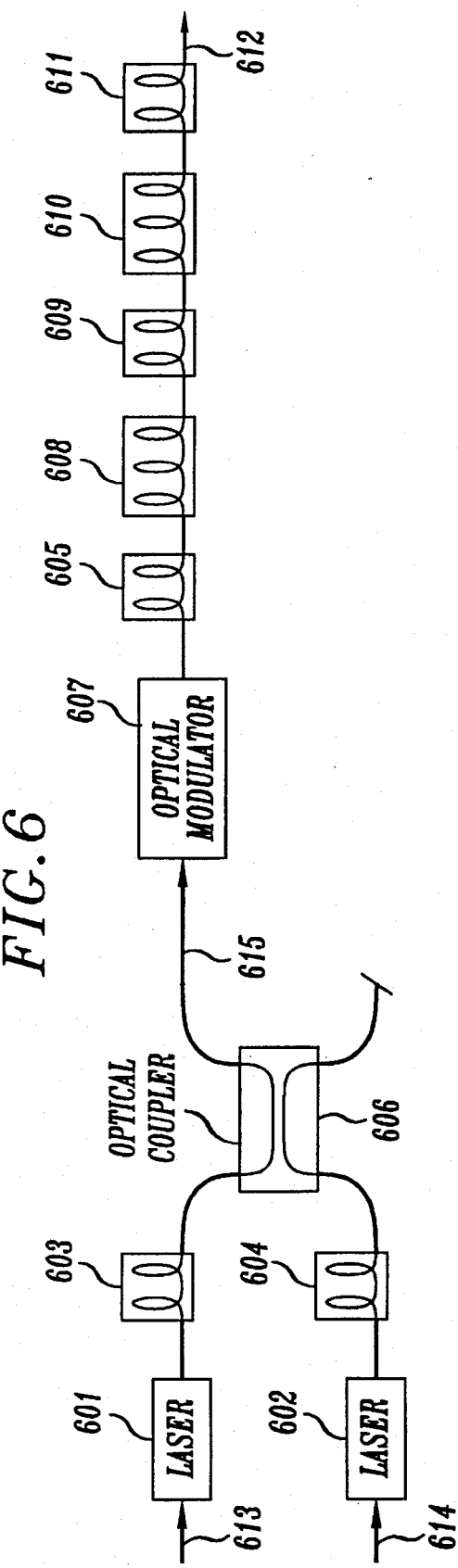

DUAL-WAVELENGTH DATA TRANSMITTER FOR REDUCING FADING IN AN OPTICAL TRANSMISSION SYSTEM

TECHNICAL FIELD

The invention relates to the optical transmission of information. More particularly, this invention relates to improving transmission capabilities over optical fiber transmission paths.

BACKGROUND

Very long optical fiber transmission paths, such as those employed in undersea or transcontinental terrestrial lightwave transmission systems which employ optical amplifier repeaters, are subject to decreased performance due to signal fading and/or fluctuations in the signal-to-noise ratio ("SNR") which are primarily caused by polarization dependent effects. In addition, these lightwave transmission systems are susceptible to degraded performance caused by nonlinearities in the optical transmission fibers.

In a long lightwave transmission system employing amplifiers, the SNR can fluctuate in a random manner. This fluctuation contributes to a phenomenon known as signal fading. Signal fading results in an increased bit error ratio ("BER") for digital signals carried by the transmission system. When the SNR of a digital signal within such a lightwave transmission system becomes unacceptably small which results in an undesirable high BER, a signal fade is said to have occurred. Experimental evidence has shown that signal fading, and the underlying SNR fluctuations, are caused by a number of polarization dependent effects induced by the optical fiber itself and other optical components (e.g., repeaters, amplifiers, etc.) along the long optical fiber transmission path. In particular, polarization dependent BER over long optical fiber transmission paths can be attributed to polarization dependent loss ("PDL"), polarization dependent gain ("PDG"), polarization mode dispersion ("PMD"), and polarization dependent hole-burning ("PDHB"). All of these effects impact signal transmission as a function of the particular state of polarization ("SOP") of an optical signal being propagated along the long optical fiber transmission path.

Fiber nonlinearities can degrade SNR by enhancing optical noise, or by causing distortion in the transmitted optical waveform. These nonlinear interactions increase as a function of the optical power level, and are dependent upon the relative SOP between the signals and the noise. If optical fibers offered a truly linear transmission medium, system performance, as measured by SNR, would improve as optical power was increased. However, the slight nonlinearity of optical fibers places an upper bound upon the level of optical power that can be transmitted thereby limiting the performance of any transmission system employing the fibers.

A prior solution to the problem of SNR fading is to simultaneously launch two signals of different wavelengths and substantially orthogonal relative polarizations into the same transmission path. Since the two signals are launched with equal power and orthogonal SOPs, the overall transmitted signal is essentially unpolarized. This has the advantage of reducing the deleterious effects of the transmission fiber's nonlinear signal/noise interactions, and signal decay caused by PDHB. The average SNR performance improvement with such a transmitter can be substantial, however, such a system is still subject to fading. For example, PMD can alter the orthogonality condition of the two waves, thus re-polarizing the signal. It is well known that the effects of PMD also vary with time. Thus, even the two wavelength source would be subject to SNR fading.

Another approach to reduce SNR fading is to control the launch polarization of a conventional single wavelength transmitter. This has been effective in repeaterless transmission arrangements where signal degradation is primariliy due to PMD. However, adjusting the polarization of a single wavelength at the transmitter only changes the launch state of the signal, and does not take into account the evolution of the axes of polarization of the signal as it propagates along the transmission system. Therefore, single wavelength transmitters cannot facilitate recovery from all SNR fading conditions. In addition, such single-wavelength transmitters cannot reduce performance limitations due to fiber nonlinearities.

SUMMARY

The problems relating to SNR fading over long optical transmission paths are overcome, in accordance with the principles of the invention, by dynamically controlling an optical signal source providing two signal components each with different wavelengths, where the parameters to be controlled include the wavelengths of the two signal components, the relative and absolute SOPs of the two signal components, and the relative delays between the data patterns carried by the two signal components so that the polarization of each of the two signal components is continuously reoptimized in the presence of PDL, PMD, PDHB, and fiber nonlinearities.

In one illustrative embodiment of the invention, a dual-wavelength data transmitter has controls to adjust the polarization of the two signal components, and delay between the data patterns carried by the components. These transmitter parameters are controlled based on a measure of the end-to-end performance, such as SNR, that is measured at the receiver end. A representation of SNR is transmitted back to the transmitter on a telemetry path.

The discussion in this Summary and the following Brief Description of the Drawings, Detailed Description, and drawings merely represents examples of this invention and is not to be considered in any way a limitation on the scope of the exclusionary rights conferred by a patent which may issue from this application. The scope of such exclusionary rights is set forth in the claims at the end of this application.

BRIEF DESCRIPTION OF THE DRAWINGS

FIG. 5 is a simplified block diagram of another illustrative arrangement, in accordance with the invention, using a single, polarization independent, data modulator;

FIG. 6 is a simplified block diagram of another illustrative arrangement, in accordance with the invention, using a polarization dependent data modulator.

DETAILED DESCRIPTION

Figure 1:
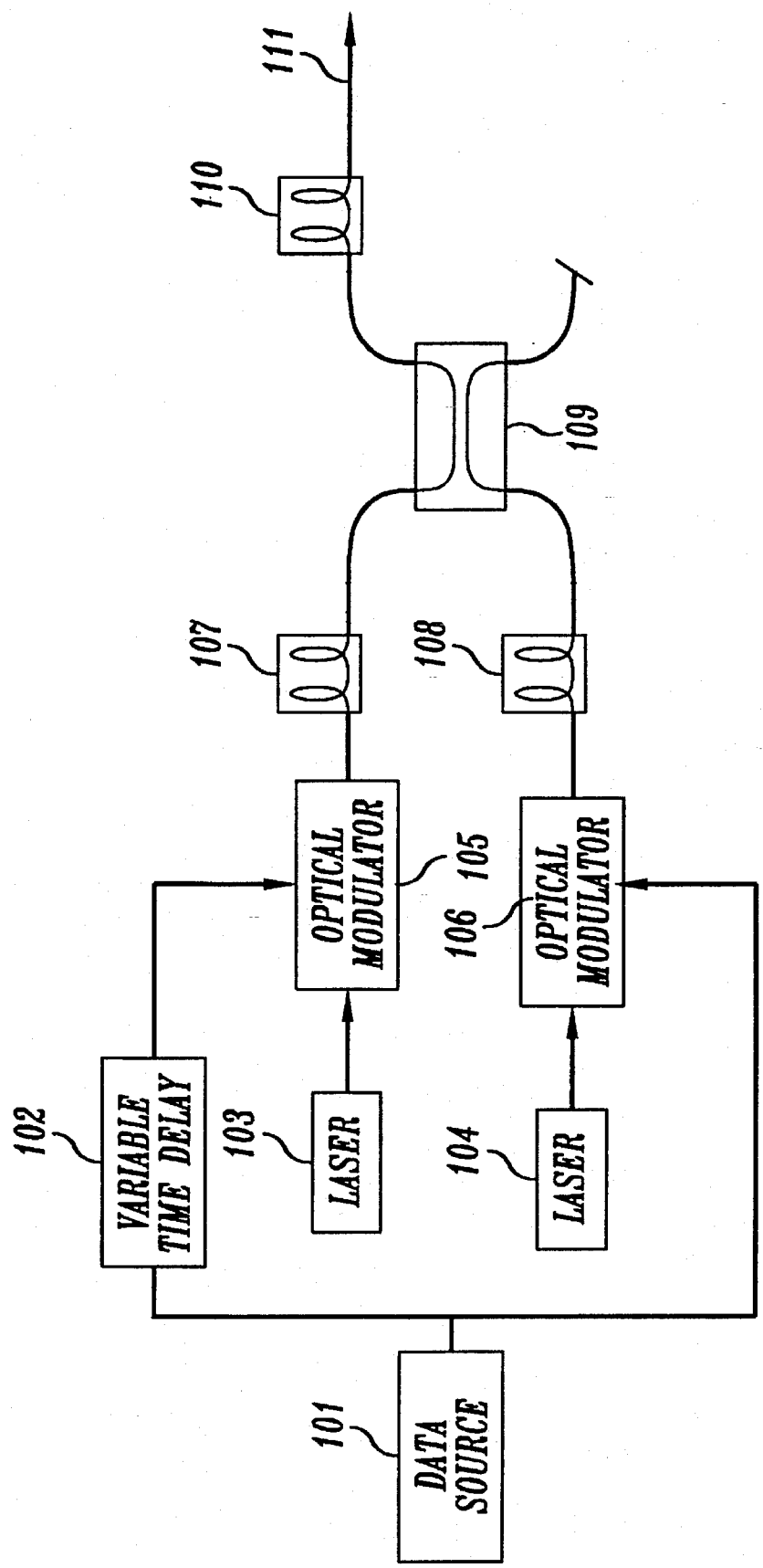
FIG. 1 is a simplified block diagram of an example of a controllable dual-wavelength transmitter, in accordance with the invention.

FIG. 1 is a simplified block diagram of an example of a controllable dual-wavelength transmitter, in accordance with the invention. The arrangement includes a data source 101, with a variable delay 102 on one of the paths to optical modulators 105 and 106, wavelength tunable lasers 103 and 104, polarization controllers ("PCs") 107, 108, and 110, optical coupler 109, and output fiber 111.

Laser 103 produces a continuous wave ("CW") optical signal having a wavelength $\lambda_1$ and power level of $P_1$. Laser 104 produces a CW optical signal having a wavelength $\lambda_2$ and power level of $P_2$. If $P_1$ and $P_2$ are equal, and $\lambda_1$ and $\lambda_2$ have orthogonal orientations, then a signal combined from $\lambda_1$ and $\lambda_2$ would be unpolarized which would would tend to reduce the deleterious effects of nonlinearity and PDHB in the transmission fiber. However, it will be appreciated by those with skill in the an that $P_1$ and $P_2$ do not necessarily need to be equal in this embodiment of the invention because the polarization of each signal $\lambda_1$ and $\lambda_2$ is independently and dynamically controlled as discussed below.

Via separate optical fibers, the output of laser 103 is routed to modulator 105, and the output of laser 104 is routed to modulator 106. In some applications, it may be desirable that lasers 103 and 104 be wavelength tunable semiconductor lasers which are well known in the art. The laser output is modulated by modulators 105 and 106 with the same data waveform provided by data source 101. Modulators 105 and 106 can be one of several types that are well known in the art. For example, it may be advantageous in some applications to use the polarization independent type of modulator described by M. Suzuki, H. Tanaka, Y. Matsushima, "InGaAsP Electroabsorption Modulator for High-Bit Rate EDFA System," IEEE Photonics Technology Letters, Vol. 4, No. 6, June 1992. Alternatively, the modulator could be a single polarization modulator, of the Mach-Zehnder type described by S. K. Korotky, J. J. Veselka, et al., "High-Speed, Low-Power Optical Modulator with Adjustable Chirp Parameter," 1991 Integrated Photonics Research Conference, Monterey, Calif.

The outputs of modulators 105 and 106 are routed to PCs 107 and 108. PCs 107 and 108 may be, for example, the Lefevre-type polarization controllers which are well-known in the art. Such controllers are described by H. C. Lefevre in IEEE Electronics Letters, Vol. 16, p. 778, 1980. After emerging from the two polarization controllers, the $\lambda_1$ and $\lambda_2$ signals are combined onto the same fiber via optical coupler 109. A final polarization controller 110 adjusts the SOP of the combined $\lambda_1$ and $\lambda_2$ signal. The modulated combined signal is routed to a remote receiver via long-haul optical fiber 111.

As stated above, modulators 105 and 106 modulate wavelengths $\lambda_1$ and $\lambda_2$, respectively, with the same data waveform from data source 101. The electrical and optical path lengths are arranged such that the average delays from data source 101 to the output of coupler 109 are the same, so that the data signals modulated on $\lambda_1$ and $\lambda_2$ are coincident. Variable time delay 102 is used to make small adjustments in the relative phases of the data on $\lambda_1$ and $\lambda_2$. Those with skill in the art will appreciate that these adjustments may be advantageously used to correct for PMD and chromatic dispersion in the transmission fiber.

The wavelengths of lasers 103 and 104 are adjusted to optimize end-to-end performance of a long optical transmission path. Changes to the wavelengths alter the evolution of the polarization of the signal as it propagates down the length of the long optical transmission path which advantageously allows for recovery from an SNR fade.

PCs 107 and 108 adjust the relative SOPs of $\lambda_1$ and $\lambda_2$, and are used to reoptimize the SOPs of the two signal components, which can be altered by the PMD in the transmission fiber. Finally, PC 110 adjusts both $\lambda_1$ and $\lambda_2$ together to optimize the end-to-end SNR of the transmission system.

Figure 2:
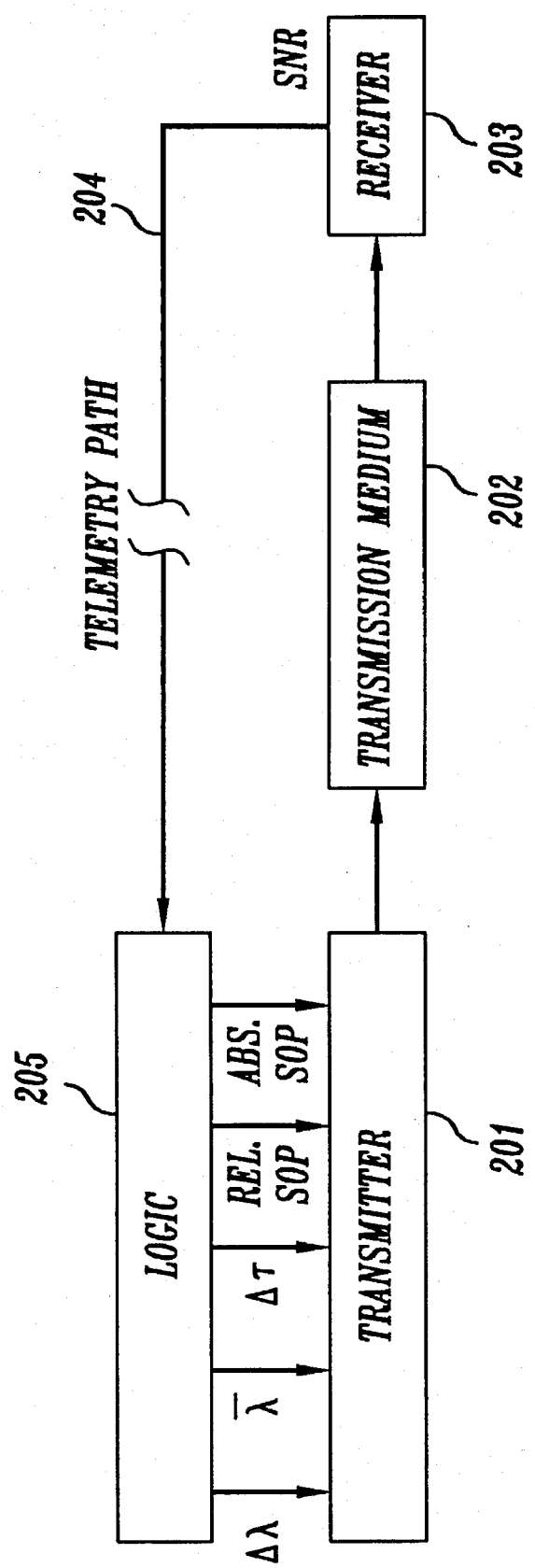
FIG. 2 is an example of a transmission system architecture including a transmitter, receiver, transmission path, and telemetry path, in accordance with the invention.

FIG. 2 is an example of a transmission system architecture including a transmitter, receiver, transmission path, and telemetry path in accordance with the invention. Shown are transmitter 201, embodying the characteristics of the dual wavelength transmitter described in FIG. 1, transmission medium 202, and telemetry path 204 which connects receiver 203 to transmitter 201 to feedback the SNR of the received signal. Transmission medium 202, for purposes of this example, but not as a limitation on the invention, is a chain of optical amplifiers and single-mode optical fiber. These elements are well known in the art.

Transmitter 201 produces a modulated signal having two component wavelengths, as described above. The modulated signal passes through transmission medium 202 and then into receiver 203. Receiver 203 converts the optical signal emerging from the transmission medium 202 to an electrical signal, and regenerates the data. At the receiver, the SNR is measured as an indication of transmission performance. This SNR value may, for example, be the electrical SNR at the input to the regenerator's decision circuit known as the Q-factor. The SNR value is sent back to logic element 205 end via telemetry path 204. It will appreciated by those skilled in the art that it may be desirable, in some applications, for telemetry path 204 to be part of the same transmission system, such as overhead bits in a SONET frame, or an order-wire channel, or be transmitted on a different channel, such as a separate phone line.

The SNR value is received and processed by logic element 205 which controls the adjustable parameters of transmitter 201 to maximize the received SNR, and thus minimize the BER of the received signal. The control algorithm used by logic element 205 may, for example, be a simple cause and effect scheme which sequentially controls the wavelength difference $\Delta\lambda$, the average wavelength $\bar{\lambda}=(\lambda_1+\lambda_2)/2$, the delay between waveforms $\Delta\tau$, the relative SOP between $\lambda_1$ and $\lambda_2$, and the absolute SOP of $\lambda_1$ and $\lambda_2$. The control of scalar parameters $\Delta\lambda$, $\bar{\lambda}$, and $\Delta\tau$, are accomplished with a dithering technique where each scalar parameter is varied in a positive and then negative amount around the starting point, and the resulting SNR is measured. The final position for the parameter is the one which gives maximum SNR performance.

Figure 3:
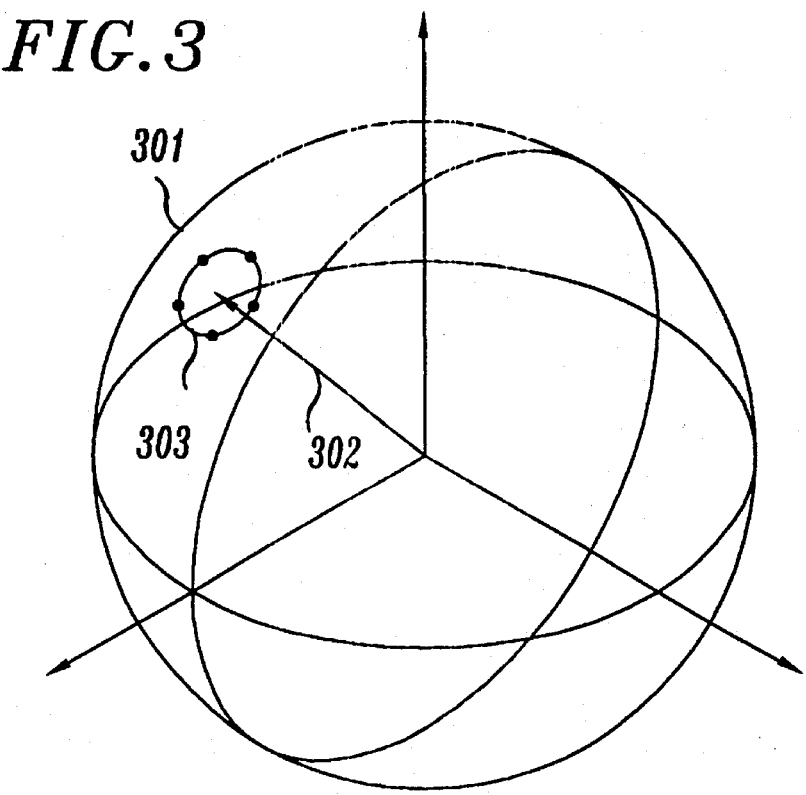
FIG. 3 schematically shows an example of a dithering technique using the unit Poincaré sphere at a starting state of polarization of a signal.
Figure 4:
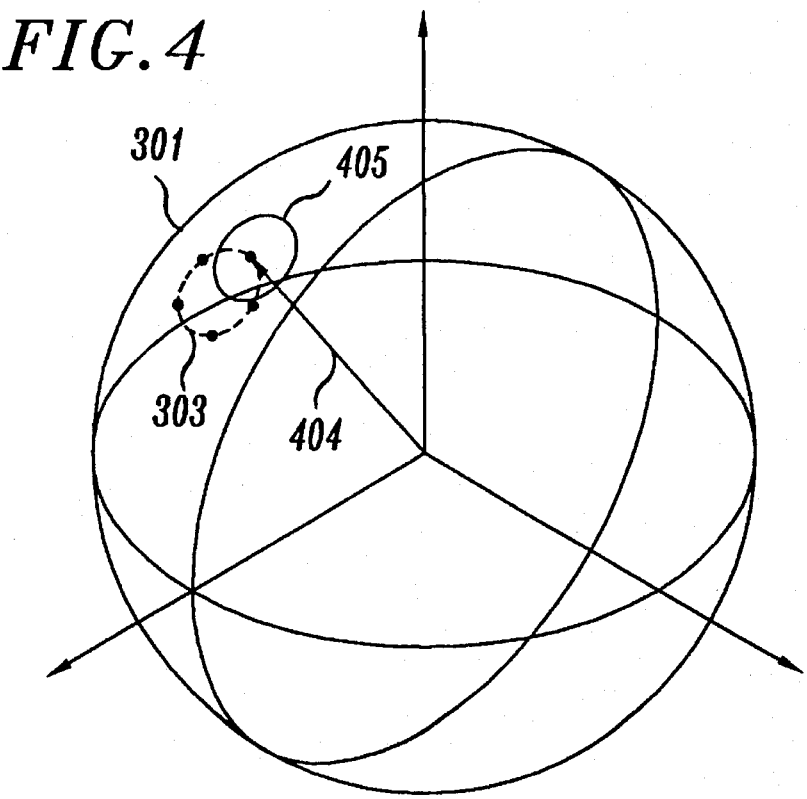
FIG. 4 schematically shows an example of a dithering technique using the unit Poincaré sphere at an adjusted state of polarization of a signal.

As will be appreciated by those with skill in the art, the dithering technique must take into account two degrees of freedom since the SOP of a signal is a vector quantity. FIGS. 3 and 4 schematically show an example of a dithering technique using the unit Poincaré sphere 301 which is well known to those with skill in the art. In FIG. 3, the starting SOP is represented by vector 302. The dither trajectory 303 is drawn around the starting SOP as a circle on the Poincaré sphere, with the endpoint of vector 302 as its center. The polarization controller is adjusted such that the SOP precesses about the circular dither trajectory. At a predetermined number of equidistant points from dither trajectory 303, the SNR of the received signal is measured. The initial condition vector 302 is then replaced with vector 404, as shown in FIG. 4, which represents the SOP on the dither trajectory 303 resulting in the best SNR. A new circular dither trajectory 405 is then drawn using the endpoint of vector 404 as its center, and the process above is repeated.

FIG. 5 shows another illustrative arrangment of elements, in accordance with the invention, using a single, polarization-independent, dam modulator. This arrangement is similar to the one shown in FIG. 1 with the exception of the adjustment of the relative delay between data signals, $\Delta\tau$. This arrangement includes wavelength tunable lasers 501 and 502, PCs 503,504, and 508, 3 dB optical coupler 505, optical modulator 506, and output fiber 509. Laser 501 produces a CW optical signal having a wavelength $\lambda_1$. Laser 502 produces a CW optical signal having a wavelength $\lambda_2$. As with the illustrative arrangement of FIG. 1, the $\lambda_1$ and $\lambda_2$ signals may have equal or unequal powers. Lasers 501 and 502 may be wavelength tunable semiconductor lasers, which are well known in the art. The wavelength of the $\lambda_1$ signal is set by laser control signal 510, and the wavelength of the $\lambda_2$ signal is set by control signal 511.

Via separate optical fibers, the output of laser 501 is routed to PC 503, and the output of laser 502 is routed to PC 504. PC 503 and 504 are, for purposes of this example only, Lefevre-type polarization controllers.

Each of the optical signals is then fed to optical coupler 505 via separate optical fibers. Optical coupler 505 serves to combine the $\lambda_1$ and $\lambda_2$ signals onto single optical fiber 507. The combined signal is then modulated by optical modulator 506 so that both the $\lambda_1$ and $\lambda_2$ components carry the same data. The modulated combined signal passes through polarization controller 508 and is then routed to a remote receiver via long-haul optical fiber 509.

The active controls for the transmitter in this illustrative arrangement operate in a similar fashion to those associated with the transmitter shown in FIG. 1. The relative SOP is adjusted by polarization controllers 503 and 504. The absolute SOP of both wavelengths are adjusted by polarization controller 508.

FIG. 6 shows another illustrative arrangement of elements, in accordance with the invention, using a single, polarization-dependent, optical modulator. This arrangement includes tunable lasers 601 and 602, PCs 603,604, 605, 609, and 611, all of which are Lefevre-type polarization controllers for purposes of this example, optical coupler 606, single, polarization-dependent, optical modulator 607, and high-birefringence fibers 608 and 610. Laser 601 produces a CW optical signal having a wavelength of $\lambda_1$, and laser 602 produces a CW optical signal having a wavelength of $\lambda_2$. The power levels of $\lambda_1$ and $\lambda_2$ may or may not be equal.

The output of laser 601 is routed to PC 603, and the output of laser 602 is routed to PC 604. The PCs are adjusted to align the SOP of the $\lambda_1$ optical signal, and the SOP of the $\lambda_2$ optical signal with the modulation axis of single-polarization optical modulator 607.

The aligned optical signals output by PCs 603 and 604 are then fed to optical coupler 606, which combines them onto a single optical fiber. This combined signal is output upon optical fiber 615. The combined signal is then modulated by polarization-dependent optical modulator 607 so that both the $\lambda_1$ and $\lambda_2$ components carry the same dam. The modulated signal output by polarization-dependent optical modulator 607 is then routed through PC 605, which can adjust the launch SOPs of the $\lambda_1$ and $\lambda_2$ components into the first high birefringence fiber 608. The signal is then routed though PC 609, and then the second high birefringence fiber 610. Finally, the signal goes through PC 611, and then long transmission fiber 612.

The high birefringence fibers 608 and 610 are conventional polarization maintaining fiber such as the SM.15-P-8/125-UV/UV-400 fiber available from Fujikara, Ltd. of Tokyo, Japan. High birefringence fibers are chosen to have a PMD characteristic (i.e., $\Delta\tau$) which functions to realign the SOPs of $\lambda_1$ and $\lambda_2$ components of the combined signal so that they can be different SOPs with respect to one another. The two high birefringence fibers 608 and 610 are connected via PC 609, which accommodates the wavelength tuneability of the two lasers. With this arrangement, the birefringences in high birefringence fibers 608 and 610 can either add, or subtract, according to the setting of PC 609. The amount of PMD required to insure that the $\lambda_1$ and $\lambda_2$ components can exit the PMFs with orthogonal SOPs is computed as follows:

$$\Delta\tau = \frac{\lambda_0^2}{2c(\Delta\lambda_{min})}$$

where $\Delta\tau$ is the total PMD in both high birefringence fibers 608 and 610, $\lambda_0$ is the mean wavelength equal to $(\lambda_1+\lambda_2)/2$, c is the speed of light, and $\lambda_{min}$ is the smallest wavelength spacing expected. For example, if $\lambda_0$ is 1558 nm and $\lambda_{min}$ is 0.1 nm, then the total PMD $\Delta\tau$ is approximately 40 psec, which would be equally divided with 20 psec in fiber 508, and 20 psec in fiber 510.

In this illustrative embodiment, the wavelength of source 601, $\lambda_1$, is adjusted by wavelength control 613 and the wavelength of 602 ,$\lambda_2$, is adjusted by control 614. The relative SOP between $\lambda_1$ and $\lambda_2$ is adjusted by PCs 605 and 609, and the combined SOP is adjusted by PC 611.

The above-described invention provides a technique for reducing signal fading over optical transmission paths. It will be understood that the particular methods described are only illustrative of the principles of the present invention, and that various modifications could be made by those skilled in the art without departing from the spirit and scope of the present invention, which is limited only by the claims that follow. For example, it may be desirable in some applications to control the relative power difference between $P_1$ and $P_2$.

I claim:

1. An apparatus for reducing signal-to-noise ratio fading in an optical transmission path, comprising:

a means for generating an optical signal having a first and a second signal component where said first and second signal components have a wavelength difference $\Delta\lambda$;

a means for modulating said first and second signal components so that each of said first and second signal components carries substantially identical information in response to a data signal from a data source;

a means for varying said wavelength difference $\Delta\lambda$ in response to a signal representing a predetermined characteristic of said optical signal as received at a remote end of said transmission path;

a means for varying the phase between said modulated first and second components of said optical signal in response to said signal representing said predetermined characteristic;

a means for varying the state of polarization of each of said first and second components of said optical signal in response to said signal representing said predetermined characteristic;

a means for combining said first and second components of said optical signal into a combined optical signal; and a means for varying the state of polarization of said combined optical signal in response to said signal representing said predetermined characteristic.

2. An apparatus for reducing signal-to-noise ratio fading in an optical transmission path, comprising:

a transmitter including a means for generating an optical signal having a first and a second signal components where said first and second signal components have a wavelength difference $\Delta\lambda$;

a means for modulating said first and second signal components so that each of said first and second signal components carries substantially identical information in response to a data signal from a data source;

a means for combining said first and second components of said optical signal into a combined optical signal;

a means for launching said combined optical signal into said optical transmission path for transmission to a remote location;

a means for varying said wavelength difference $\Delta\lambda$, in response to a signal representing a predetermined characteristic of said combined optical signal as received at a remote end of said transmission path;

a means for varying the phase between said modulated first and second components of said optical signal in response to said signal representing said predetermined characteristic;

a means for varying the state of polarization of each of said first and second components of said optical signal in response to said signal representing said predetermined characteristic;

a means for varying the state of polarization of said combined optical signal in response to said signal representing said predetermined characteristic;

a means for receiving said transmitted combined optical signal;

a means for measuring said predetermined characteristic of said received combined optical signal; and a means for transmitting said signal representing said predetermined characteristic of said combined optical signal received at said remote location to said transmitter.

3. The apparatus of claim 2 wherein said first and second signal components of said optical signal have substantially identical power.

4. The apparatus of claim 2 wherein said means for combining comprises an optical coupler.

5. The apparatus of claim 2 wherein said first signal component of said polarized optical signal has a wavelength $\lambda_1$ and said second signal component of said polarized optical signal has a wavelength $\lambda_2$ and said means for varying said wavelength difference $\Delta\lambda$ includes means for varying wavelength $\lambda_1$ and means for varying wavelength $\lambda_2$.

6. The apparatus of claim 2 wherein said means for generating said polarized optical signal comprises a first and a second laser where said first laser generates said first signal component of said optical signal and said second laser generates said second signal component of said optical signal.

7. The apparatus of claim 6 wherein said first and second lasers each comprise a wavelength tunable laser.

8. The apparatus of claim 2 wherein said means for varying the phase between said first and second signal components includes means for delaying a source of information supplied to said means for modulating said first signal component.

9. A method for reducing signal-to-noise ratio fading in an optical transmission path, the method comprising the steps of:

transmitting including generating an optical signal having a first and a second signal components where said first and second signal components have a wavelength difference $\Delta\lambda$;

modulating said first and second signal components so that each of said first and second signal components carries substantially identical information in response to a data signal from a data source;

varying said wavelength difference $\Delta\lambda$ in response to a signal representing a predetermined characteristic of said optical signal as received at a remote end of said transmission path;

varying the phase between said modulated first and second components of said optical signal in response to said signal representing said predetermined characteristic;

varying the state of polarization of each of said first and second components of said optical signal in response to said signal representing said predetermined characteristic;

combining said first and second components of said optical signal into a combined optical signal;

varying the state of polarization of said combined optical signal in response to said signal representing said predetermined characteristic;

launching said combined optical signal into said optical transmission path for transmission to a remote location;

receiving said transmitted combined optical signal;

measuring said predetermined characteristic of said received combined optical signal; and transmitting signal representing said predetermined characteristic of said combined optical signal received at said remote location to a transmitter.

10. The method of claim 9 wherein said first and second signal components of said optical signal have substantially identical power.

11. The method of claim 9 wherein said step for combining is performed by an optical coupler.

12. The method of claim 9 wherein said first signal component of said polarized optical signal has a wavelength $\lambda_1$ and said second signal component of said polarized optical signal has a wavelength $\lambda_2$ and said step for varying said wavelength difference $\Delta\lambda$ includes varying wavelength $\lambda_1$ and varying wavelength $\lambda_2$.

13. The method of claim 9 wherein said step of generating said polarized optical signal is performed by a first and a second laser where said first laser generates said first signal component of said optical signal and said second laser generates said second signal component of said optical signal.

14. The method of claim 13 wherein said first and second lasers each comprise a wavelength tunable laser.

15. The apparatus of claim 9 wherein said step of varying the phase between said first and second signal components includes delaying a source of information supplied to a means for modulating said first signal component.

16. The apparatus of claim 1 wherein said predetermined characteristic is signal-to-noise ratio.

17. The apparatus of claim 1 wherein said predetermined characteristic is Q-factor.

18. The apparatus of claim 2 wherein said predetermined characteristic is signal-to-noise ratio.

19. The apparatus of claim 2 wherein said predetermined characteristic is Q-factor.

20. The method of claim 9 wherein said predetermined characteristic is signal-to-noise ratio.

21. The method of claim 9 wherein said predetermined characteristic is Q-factor.

22. A method for reducing signal-to-noise ratio fading in an optical transmission system, comprising the steps of:

generating an optical signal having a first and second signal components where said first and second signal components have a wavelength difference $\Delta\lambda$;

modulating said first and second signal components so that each of said first and second components carries substantially identical information in response to a data signal from a data source;

varying said wavelength difference $\Delta\lambda$ in response to a signal representing a predetermined characteristic of said optical signal as received at a remote end of said transmission path;

varying the phase between said modulated first and second components of said optical signal in response to said signal representing said predetermined characteristic;

varying the state of polarization of each of said first and second components of said optical signal in response to said signal representing said predetermined characteristic;

combining said first and second components of said optical signal in response to said signal representing said predetermined characteristic; and varying the state of polarization of said combined optical signal in response to said signal representing said predetermined characteristic.

23. The method of claim 22 wherein said first and second signal components of said optical signal have substantially identical power.

24. The method of claim 22 wherein said step for combining is performed by an optical coupler.

25. The method of claim 22 wherein said first signal component of said polarized optical signal has a wavelength $\lambda_1$ and said second signal component of said polarized optical signal has a wavelength $\lambda_2$ and said step for varying said wavelength difference $\Delta\lambda$ includes varying wavelength $\lambda_1$ and varying wavelength $\lambda_2$.

26. The method of claim 22 wherein said step of generating said polarized optical signal is performed by a first and a second laser where said first laser generates said first signal component of said optical signal and said second laser generates said second signal component of said optical signal.

27. The method of claim 26 wherein said first and second lasers each comprise a wavelength tunable laser.

28. The apparatus of claim 22 wherein said step of varying the phase between said first and second signal components includes delaying a source of information supplied to a means for modulating said first signal component.

29. An apparatus for reducing signal-to-noise ratio fading in an optical transmission system, comprising:

at least one laser for generating an optical signal having a first and a second signal component where said first and second signal components have a wavelength difference $\Delta\lambda$; wherein said at least one laser includes wavelength tuning means for varying said wavelength difference $\Delta\lambda$ in response to a signal representing a predetermined characteristic of said optical signal as received at a remote end of said transmission path;

at least one optical modulator for modulating said first and second signal components so that each of said first and second signal components carries substantially identical information in response to a data signal from a data source;

a variable time delay for varying the phase between said modulated first and second components of said optical signal in response to said signal representing said predetermined characteristic;

at least one polarization controller for varying the state of polarization of each of said first and second components of said optical signal in response to said signal representing said predetermined characteristic;

an optical coupler for combining said first and second components of said optical signal into a combined optical signal; and at least one other polarization controller for varying the state of polarization of said combined optical signal in response to said signal representing said predetermined characteristic.

30. A method for reducing signal-to-noise ratio fading in an optical transmission system, comprising the steps of:

transmitting an optical signal having a first and second signal components wherein said transmitting is performed according at least one predetermined transmitting parameter;

modulating said first and second signal components so that each of said first and second components carries substantially identical information in response to a data signal from a data source; and varying said at least one predetermined transmitting parameter in response to a signal representing a predetermined characteristic of said optical signal as received at a remote end of said transmission path.

31. The method of claim 30 further including the step of combining said first and second components of said optical signal in response to said signal representing said predetermined characteristic.

32. The method of claim 30 further including the step of varying the state of polarization of said combined optical signal in response to said signal representing said predetermined characteristic.

33. The method of claim 30 wherein said at least one predetermined transmitting parameter is a delay $\Delta\tau$ between said first and second signal components.

34. The method of claim 30 wherein said at least one predetermined transmitting parameter is an average of wavelengths $\overline{\lambda}$ of said first and second signal components.

35. The method of claim 30 wherein said at least one predetermined transmitting parameter is a wavelength difference $\Delta\lambda$ between said first and second signal components.

36. The method of claim 30 wherein said at least one predetermined transmitting parameter is a relative state-of-polarization between said first and second signal components.

37. The method of claim 30 wherein said at least one predetermined transmitting parameter is an absolute state of polarization of said first and second signal components.

38. The method of claim 30 wherein said predetermined characteristic is signal-to-noise ratio.

39. The method of claim 30 wherein said predetermined characteristic is Q-factor.

* * * * *